United States Patent
Tokuichi et al.

(10) Patent No.: US 11,839,933 B2
(45) Date of Patent: *Dec. 12, 2023

(54) LASER PROCESSING APPARATUS

(71) Applicant: HONDA MOTOR CO., LTD., Tokyo (JP)

(72) Inventors: Hiroki Tokuichi, Tochigi (JP); Shin Yoshida, Tochigi (JP); Takanori Sato, Tochigi (JP); Yuichi Hirata, Tochigi (JP); Naruhiko Okubo, Tochigi (JP); Koki Mizutani, Tochigi (JP)

(73) Assignee: HONDA MOTOR CO., LTD., Tokyo (JP)

(*) Notice: Subject to any disclaimer, the term of this patent is extended or adjusted under 35 U.S.C. 154(b) by 242 days.

This patent is subject to a terminal disclaimer.

(21) Appl. No.: 17/183,374

(22) Filed: Feb. 24, 2021

(65) Prior Publication Data

US 2021/0268603 A1 Sep. 2, 2021

(30) Foreign Application Priority Data

Feb. 27, 2020 (JP) ................................ 2020-031335

(51) Int. Cl.
*B23K 26/08* (2014.01)
*B23K 26/16* (2006.01)
*B23K 26/70* (2014.01)

(52) U.S. Cl.
CPC ...... *B23K 26/0838* (2013.01); *B23K 26/0869* (2013.01); *B23K 26/16* (2013.01); *B23K 26/706* (2015.10)

(58) Field of Classification Search
CPC ... B23K 26/0869; B23K 26/142; B23K 26/16
See application file for complete search history.

(56) References Cited

U.S. PATENT DOCUMENTS

2006/0118529 A1 6/2006 Aoki et al.
2006/0150788 A1 7/2006 Kim
(Continued)

FOREIGN PATENT DOCUMENTS

CN 1652895 A 8/2005
CN 1796064 A 7/2006
(Continued)

OTHER PUBLICATIONS

Notification of Reasons for Refusal issued in the JP Patent Application No. 2020-031335, dated Sep. 19, 2023.
(Continued)

*Primary Examiner* — Erin McGrath
(74) *Attorney, Agent, or Firm* — CKC & Partners Co., LLC (57) ABSTRACT

A laser processing apparatus 3 includes: a laser head H; a head driving mechanism that moves the laser head H above a workpiece W; and a dust collecting box 60 that moves below the workpiece W and follows the laser head H. A non-contact support unit 7 is provided at an opening 61 of the dust collecting box 60, and the non-contact support unit 7 suctions a lower surface of the workpiece W toward a suction surface 71 and supports the workpiece W without bringing the lower surface of the workpiece W and the suction surface 71 into contact with each other. An outer support roller 81 and an inner support roller 82 that are each rotatable about an axis parallel to a width direction orthogonal or substantially orthogonal to a conveying direction Fy are provided at the opening 61.

9 Claims, 7 Drawing Sheets

(56) References Cited

U.S. PATENT DOCUMENTS

| | | |
|---|---|---|
| 2013/0098876 A1 | 4/2013 | Kobayashi et al. |
| 2017/0216970 A1 | 8/2017 | Milne |
| 2018/0133838 A1* | 5/2018 | Summerer ......... B23K 26/0846 |
| 2018/0222679 A1* | 8/2018 | Iwasaka .................... A23L 5/20 |
| 2018/0257177 A1 | 9/2018 | Sato et al. |
| 2019/0247954 A1* | 8/2019 | Pahk .................... B23K 26/142 |

FOREIGN PATENT DOCUMENTS

| | | | |
|---|---|---|---|
| CN | 103056528 | A | 4/2013 |
| CN | 209407667 | U | 9/2019 |
| JP | H04361890 | A | 12/1992 |
| JP | H0662512 | A | 3/1994 |
| JP | 2000153427 | A | 6/2000 |
| JP | 2010029929 | A | 2/2010 |
| JP | 2013086144 | A | 5/2013 |
| JP | 2013086167 | A | 5/2013 |
| JP | 2017534461 | A | 11/2017 |
| JP | 2018516760 | A | 6/2018 |
| WO | 2004065055 | A1 | 8/2004 |
| WO | 2017047785 | A1 | 3/2017 |

OTHER PUBLICATIONS

Notification of Reasons for Refusal issued in the related JP Patent Application No. 2020-031336, dated Sep. 26, 2023.

\* cited by examiner

LASER PROCESSING APPARATUS

This application is based on and claims the benefit of priority from Japanese Patent Application No. 2020-031335, filed on 27 Feb. 2020, the content of which is incorporated herein by reference.

BACKGROUND OF THE INVENTION

Field of the Invention

The present invention relates to a laser processing apparatus. More specifically, the present invention relates to a laser processing apparatus for cutting plate material by moving a laser irradiation unit above the plate material which is conveyed by a conveying device.

Related Art

Conventionally, a laser processing apparatus has been proposed which cuts plate material into a desired shape to prepare a blank material by moving a laser head which irradiates a laser beam above the plate material fed by a conveying device. When continuously feeding the plate material to be cut by such a laser processing apparatus from a coil material rolled in a roll shape, the waviness of the plate material is often removed and the plate material is linearly straightened by a leveler device before irradiating the laser beam by a laser irradiation unit.

However, it is sometimes not possible for such a leveler device to sufficiently remove the waviness of the coil material, such that a slight waviness still remains in the plate material. If waviness remains in the plate material to be fed to the laser head, the distance between the laser head and the plate material varies, whereby a case arises in which the focal length of the laser head varies, and thus is not be able to cut the plate material with good precision. Therefore, in the laser processing apparatus shown in PCT International Publication No. WO2017/047785, a laser head is moved while straightening the waviness remaining in the plate material by pressing the plate material with a brush.

Patent Document 1: PCT International Publication No. WO2017/047785

SUMMARY OF THE INVENTION

According to the laser processing apparatus shown in PCT International Publication No. WO2017/047785, the distance between the laser head and the plate material can be maintained constant by pressing the plate material with the brush, for example; however, when pressing a relatively soft plate material such as an aluminum alloy with the brush, the surface of the plate material may be scratched by the brush, which reduces the yield, leading to an increase in cost.

It is an object for the present invention to provide a laser processing apparatus capable of applying a laser beam while removing waviness without causing damage to the surface of plate material.

A first aspect of the present invention relates to a laser processing apparatus (for example, a laser processing apparatus 3 described later) including: a laser irradiation unit (for example, a laser head H described later); a drive unit (for example, a head driving mechanism 5 described later) that moves the laser irradiation unit above a plate material (for example, a workpiece W) which is conveyed along a conveying direction (for example, a conveying direction Fy described later); and a dust collecting unit (for example, a dust collecting box 60 described later) that moves below the plate material and follows the laser irradiation unit such that the dust collecting unit is disposed directly below the laser irradiation unit, in which a non-contact support unit (for example, a non-contact support pad 7 described later) is provided at an opening (for example, an opening 61 described later) of the dust collecting unit, and the non-contact support unit suctions a lower surface (for example, a suction surface 71 described later) of the plate material toward a suction surface and supports the plate material without bringing the lower surface of the plate material and the suction surface into contact with each other.

According to a second aspect of the present invention, it is preferable that the non-contact support unit and a roller (for example, an outer support roller 81 and an inner support roller 82) that is rotatable about an axis parallel to a width direction (for example, a width direction Fx described later) orthogonal or substantially orthogonal to the conveying direction are provided at the opening, and the lower surface of the plate material is in contact with an outer peripheral surface of the roller.

According to a third aspect of the present invention, it is preferable that the opening includes an upstream-side opening edge (for example, an upstream-side opening edge 64 described later) extending along the width direction, and a downstream-side opening edge (for example, a downstream-side opening edge 65 described later) extending along the width direction on a downstream side of the upstream-side opening edge in the conveying direction, in a plan view, and the roller includes a plurality of rollers, and the non-contact support portion includes a plurality of non-contact support portions, and one or more of the rollers and one or more of the non-contact support portions are provided alternately along the width direction at each of the upstream-side opening edge and the downstream-side opening edge.

According to a fourth aspect of the present invention, it is preferable that the laser processing apparatus further includes a shielding plate (for example, an upstream cover 66 and a downstream cover 67 described later) that covers a periphery of the roller and the suction surface, in which the non-contact support unit suctions the lower surface of the plate material toward the suction surface by a negative pressure generated between the lower surface of the plate material and the suction surface when a swirling flow of air from a nozzle (for example, a nozzle hole 74 described later) provided at an outer peripheral edge (for example, an outer peripheral edge 72) of the suction surface is ejected, a portion of the outer peripheral surface of the roller protrudes from an upper surface of the shielding plate, and the suction surface is buried from the upper surface of the shielding plate.

According to a fifth aspect of the present invention, it is preferable that the shielding plate covers at least a portion of the outer peripheral edge, and a gap (for example, a gap 69 described later) is provided between the outer peripheral edge and a lower surface of the shielding plate.

According to a sixth aspect of the present invention, it is preferable that a groove (for example, a groove 66c described later) extending radially about the suction surface is provided at a lower surface of the shielding plate.

(1) A laser processing apparatus according to the present invention includes: a laser irradiation unit; a drive unit that moves the laser irradiation unit above a plate material which is conveyed along a conveying direction; and a dust collecting unit that moves below the plate material and follows the laser irradiation unit such that the dust collecting unit is disposed directly below the laser irradiation unit. With such a configuration, it is possible to collect a spatter caused by irradiating the plate material with the laser beam from the laser irradiation unit at the dust collecting unit. Furthermore, in the present invention, a non-contact support unit is provided at an opening of the dust collecting unit, and the non-contact support unit suctions a lower surface of the plate material toward a suction surface and supports the plate material without bringing the lower surface of the plate material and the suction surface into contact with each other. With such a configuration, since it is possible to suction a portion of the plate material to which the laser beam is irradiated to the suction surface of the non-contact support unit. Therefore, even when there is waviness in the plate material to be conveyed, it is possible to irradiate the laser beam while removing this waviness, making it possible to cut the plate material with good precision. Furthermore, in the present invention, the non-contact support unit supporting the plate material without bringing the lower surface of the plate material and the suction surface into contact with each other is used as a means for supporting the plate material, thereby making it possible to remove the waviness without causing damage to the surface of the plate material.

(2) In the present invention, the non-contact support unit, and the rollers that are each rotatable about an axis parallel to the width direction are provided at the opening of the dust collecting unit. Furthermore, in the present invention, the lower surface of the plate material is in non-contact with the suction surface of the non-contact support unit, but in contact with the outer peripheral surfaces of the rollers. According to the present invention, it is possible to remove the waviness of the plate material by the non-contact support unit suctioning the lower surface of the plate material toward the suction surface and pressing the lower surface of the plate material against the outer peripheral surfaces of the rollers. Furthermore, in this situation, it is also possible to convey the plate material along the conveying direction without causing any damage by pressing the lower surface of the plate material against the outer peripheral surfaces of the rollers.

(3) In the present invention, one or more of the rollers, and one or more of the non-contact support unit are provided alternately along the width direction for each of the upstream-side opening edge and the downstream-side opening edge extending along the width direction. With such a configuration, it is possible to suction and support the portion of the plate material to which the laser beam from the laser irradiation unit is applied, a result of which it is possible to reliably remove the waviness in the portion to which the laser beam is irradiated.

(4) In the present invention, the non-contact support unit suctions the lower surface of the plate material toward the suction surface by a negative pressure generated between the lower surface of the plate material and the suction surface when a swirling flow of air from a nozzle provided at the outer peripheral edge of the suction surface is ejected. Furthermore, in the present invention, the shielding plates cover the peripheries of the rollers, and the suction surface, a portion of the outer peripheral surface of the rollers protrudes from the upper surface of the shielding plates, and the suction surface is buried from the upper surface of the shielding plates. With such a configuration, it is possible to provide the gap that discharges the swirling flow of air between the lower surface of the plate material and the suction surface. Therefore, a negative pressure is generated between the lower surface of the plate material and the suction surface due to the Bernoulli effect while the plate material is prevented from rising by the air. By using this negative pressure, it is possible to suction the lower surface of the plate material toward the suction surface to remove the waviness in the plate material.

(5) In the present invention, the shielding plates cover at least a portion of the outer peripheral edge of the suction surface, and a gap is provided between the outer peripheral edge and the lower surfaces of the shielding plates. With such a configuration, it is possible to lead a portion of the swirling flow of air ejecting from the nozzle of the suction surface to the lower surfaces of the shielding plates. Therefore, it is possible to cool the shielding plates while generating the negative pressure between the lower surface of the plate material and the suction surface due to the Bernoulli effect. Furthermore, by cooling the shielding plates by the portion of the swirling flow of air as described above, it is possible to cool the spatter generated by irradiating the laser beam, a result of which it is possible to prevent the spatter from bonding to the rollers, the shielding plates, and the like. Furthermore, with such a configuration, it is possible to prevent the spatter from bonding to the plate material.

(6) In the present invention, a groove extending radially about the suction surface is provided at a lower surface of the shielding plates. With such a configuration, it is possible to improve the cooling effect of the shielding plates due to the swirling flow of air ejected from the nozzle of the suction surface.

DETAILED DESCRIPTION OF THE INVENTION

Hereinafter, a laser processing apparatus 3 according to an embodiment of the present invention will be described with reference to the drawings.

Figure 1:
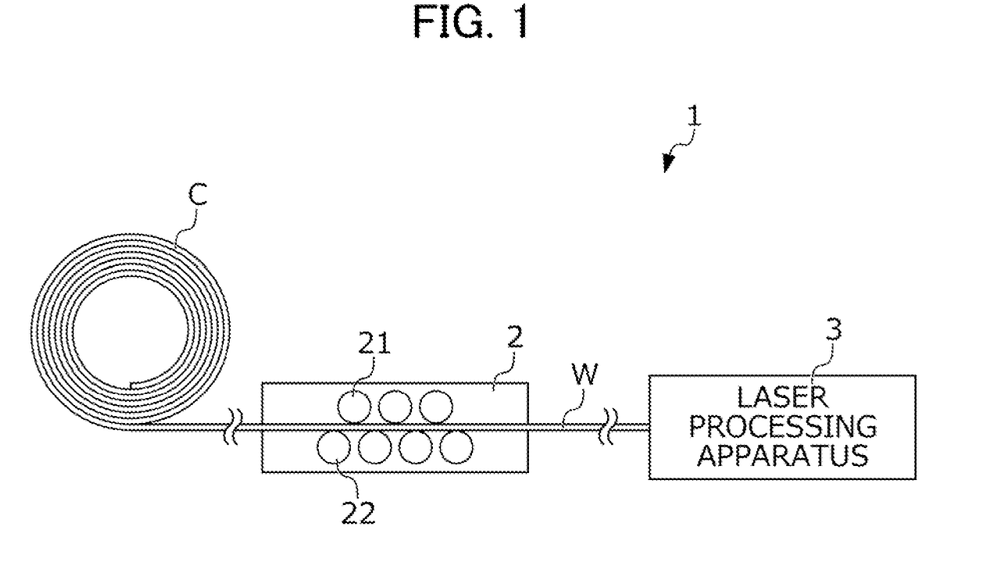
FIG. 1 is a diagram showing the configuration of a laser processing system according to an embodiment of the present invention.

FIG. 1 is a diagram showing a configuration of a laser processing system 1. The laser processing system 1 includes a leveler device 2 that removes waviness of a workpiece W which is a plate material fed from a roll-shaped coil material C and linearly straightens the workpiece W, and a laser processing apparatus 3 for cutting the workpiece W linearly straightened by the leveler device 2 with a laser beam. The workpiece W is, for example, a plate material made of an aluminum alloy or a steel plate; however, the present invention is not intended to be limited thereto.

The leveler device 2 includes a plurality of upper rollers 21 provided on the upper side in the vertical direction with respect to the workpiece W to be fed from the coil material C (in the example of FIG. 1, three pieces), and a plurality of lower rollers 22 provided across the workpiece W with respect to these upper rollers 21 (in the example of FIG. 1, four pieces). The rotation axes of the upper rollers 21 and the rotation axes of the lower rollers 22 are provided parallel to one another. These lower rollers 22 and upper rollers 21 are provided alternately along the feeding direction of the workpiece W. The leveler device 2 extends the workpiece W fed from the coil material C to be flat by the plurality of upper rollers 21 and the plurality of lower rollers 22, thereby removing the waviness of the plate material and linearly straightening the workpiece W. The workpiece W straightened linearly by the leveler device 2 is fed to the laser processing apparatus 3.

Figure 2:
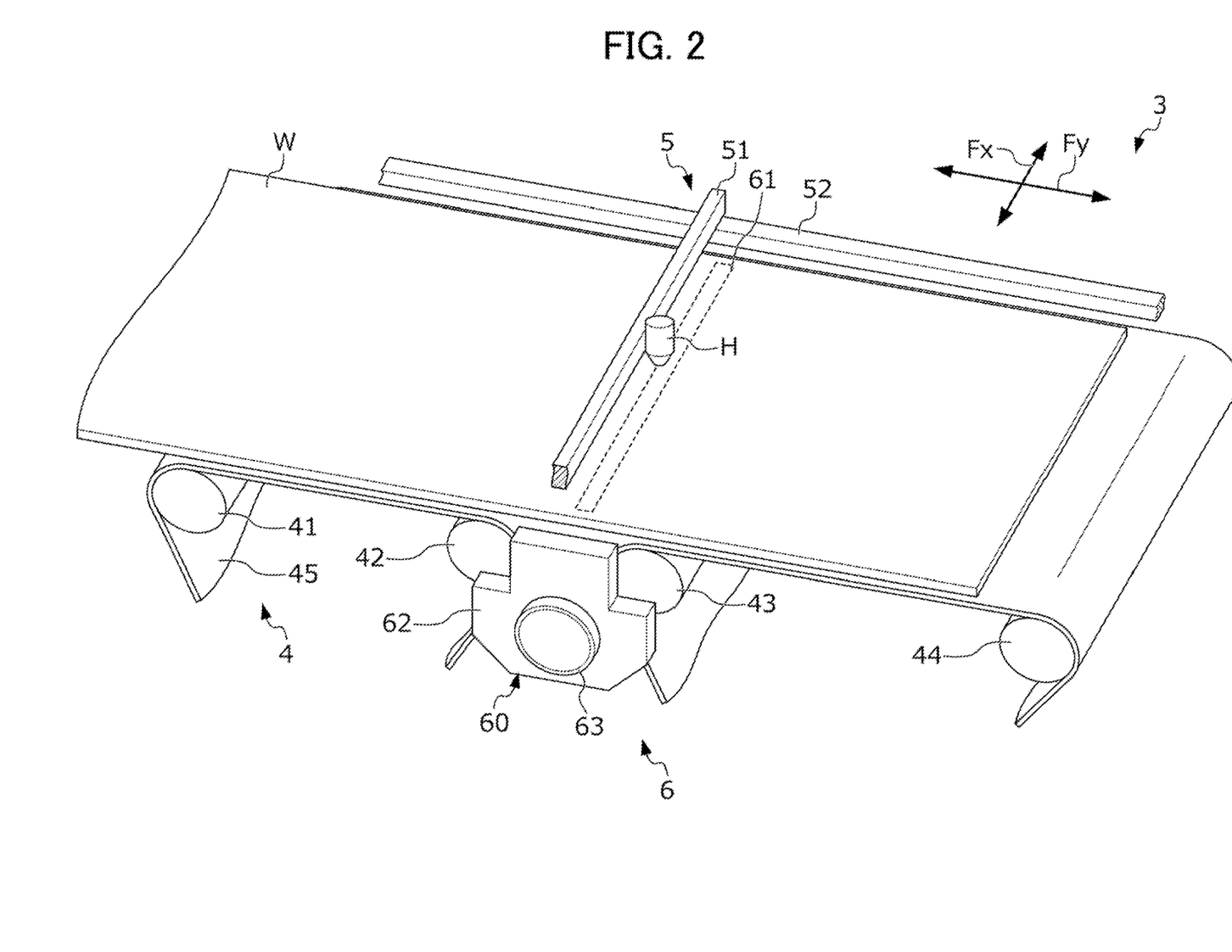
FIG. 2 is a perspective view showing a schematic configuration of a laser processing apparatus.

FIG. 2 is a perspective view showing a schematic configuration of a laser processing apparatus 3. The laser processing apparatus 3 includes a conveying device 4 for conveying the workpiece W along a conveying direction Fy, a laser head H for generating a laser beam and irradiating the workpiece W with the laser beam, a head driving mechanism 5 for moving the laser head H above the workpiece W fed along the conveying direction Fy, and a dust collector 6 for collecting a spatter caused by irradiating the workpiece W with the laser beam.

The conveying device 4 is a belt conveyor, and includes a plurality of belt rollers 41, 42, 43, and 44 which are rotatable about an axis parallel to a width direction Fx orthogonal to the conveying direction Fy (only four rollers are illustrated in FIG. 2), an endless strip-shaped belt 45 stretched over these belt rollers 41 to 44, and a roller driving device (not shown) for feeding the belt 45 to the downstream side along the conveying direction Fy by rotating any of the plurality of belt rollers 41 to 44 (for example, the first belt roller 41).

The first to fourth belt rollers 41 to 44 are provided in this order from the upstream side to the downstream side along the conveying direction Fy. Between the second belt roller 42 and the third belt roller 43, a dust collecting box 60 to be described later is provided. Furthermore, the belt 45 is stretched over the first to fourth belt rollers 41 to 44 so as to avoid the dust collecting box 60. Furthermore, the second belt roller 42 and the third belt roller 43 are slidable to the downstream side or to the upstream side along the conveying direction Fy together with the dust collecting box 60 by a box driving mechanism to be described later.

The head driving mechanism 5 includes an X-axis rail 51 extending along the width direction Fx above the belt 45, and a Y-axis rail 52 extending along the conveying direction Fy at the side portion of the belt 45. The X-axis rail 51 slidably supports the laser head H along its extending direction (i.e., the width direction Fx). The Y-axis rail 52 slidably supports the X-axis rail 51 along its extending direction (i.e., the conveying direction Fy). This allows the head driving mechanism 5 to move the laser head H along the conveying direction Fy and the width direction Fx above the workpiece W conveyed by the conveying device 4.

The dust collector 6 includes a box-shaped dust collecting box 60 extending along the width direction Fx, and a box driving mechanism (not shown) for moving the dust collecting box 60 along the conveying direction Fy.

The dust collecting box 60 is provided between the second belt roller 42 and the third belt roller 43 below the workpiece W. A rectangular opening 61 extending along the width direction Fx in a plan view is provided above the dust collecting box 60. The spatter caused by irradiating the workpiece W with a laser beam from the laser head H is collected in the dust collecting box 60 through the opening 61. The spatter collected in the dust collecting box 60 is appropriately discharged from a discharge unit 63 provided on a side cover 62.

The box driving mechanism moves the dust collecting box 60, the second belt roller 42, and the third belt roller 43 to follow the movement of the laser head H along the conveying direction Fy, such that the opening 61 of the dust collecting box 60 is disposed directly below the laser head H.

Figure 3:
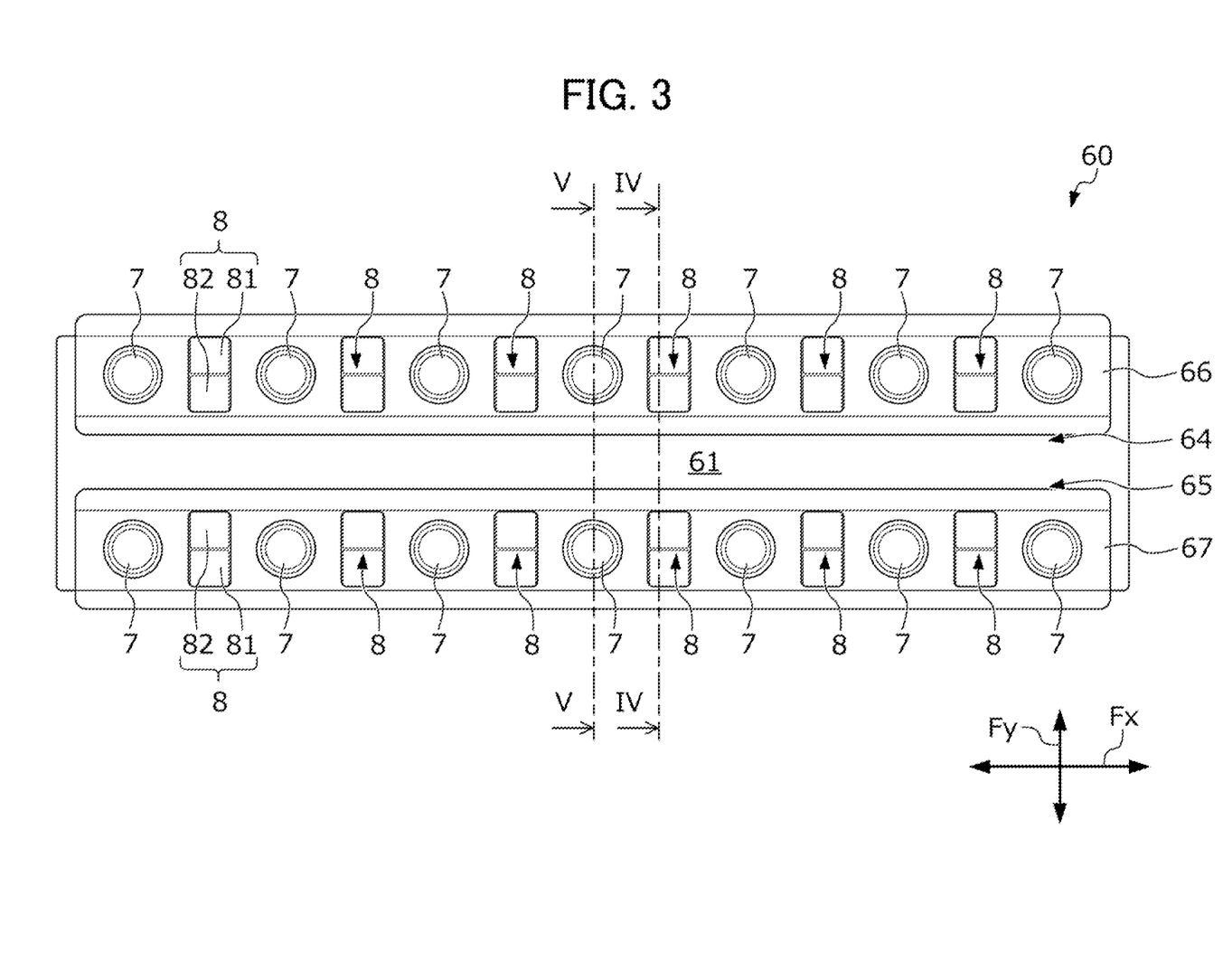
FIG. 3 is a plan view of a dust collecting box from a workpiece side.

FIG. 3 is a plan view of the dust collecting box 60 from the workpiece W side. As shown in FIG. 3, in a plan view, the opening 61 of the dust collecting box 60 has a rectangular shape, and includes an upstream-side opening edge 64 extending along the width direction Fx, and a downstream-side opening edge 65 extending along the width direction Fx on the downstream side of the upstream-side opening edge 64 in the conveying direction Fy.

The upstream-side opening edge 64 includes a plurality of disk-shaped non-contact support pads 7 (in the example of FIG. 3, seven pieces) in a plan view, the plurality of support rollers pairs 8 (in the example of FIG. 3, six sets) made by a pair of an outer support roller 81 and an inner support roller 82, and a rectangular upstream cover 66 extending along the width direction Fx in a plan view.

In the upstream-side opening edge 64, one non-contact support pad 7 and the pair of the support rollers 8 are provided in rows and alternately along the width direction Fx. It should be noted that FIG. 3 shows a case in which one non-contact support pad 7 and the pair of the support rollers 8 are provided alternately along the width direction Fx in the upstream-side opening edge 64; however, the present invention is not intended to be limited thereto. Two or more of the non-contact support pads 7 and two or more sets of the support roller pairs 8 may be provided alternately along the width direction Fx in the upstream side opening edge 64.

The downstream-side opening edge 65 includes a plurality of disk-shaped non-contact support pads 7 (in the example of FIG. 3, seven pieces) in a plan view, a plurality of the pairs of the support rollers 8 (in the example of FIG. 3, six sets), and a rectangular downstream cover 67 extending along the width direction Fx in a plan view.

In the downstream-side opening edge 65, one non-contact support pad 7 and a pair of the support rollers 8 are provided in rows and alternately along the width direction Fx. It should be noted that FIG. 3 shows a case in which one non-contact support pad 7 and the pair of the support rollers 8 are provided alternately along the width direction Fx in the downstream-side opening edge 65; however, the present invention is not intended to be limited thereto. Two or more of the non-contact support pads 7 and two or more sets of the support rollers 8 may be provided alternately along the width direction Fz in the downstream-side opening edge 65.

Figure 4:
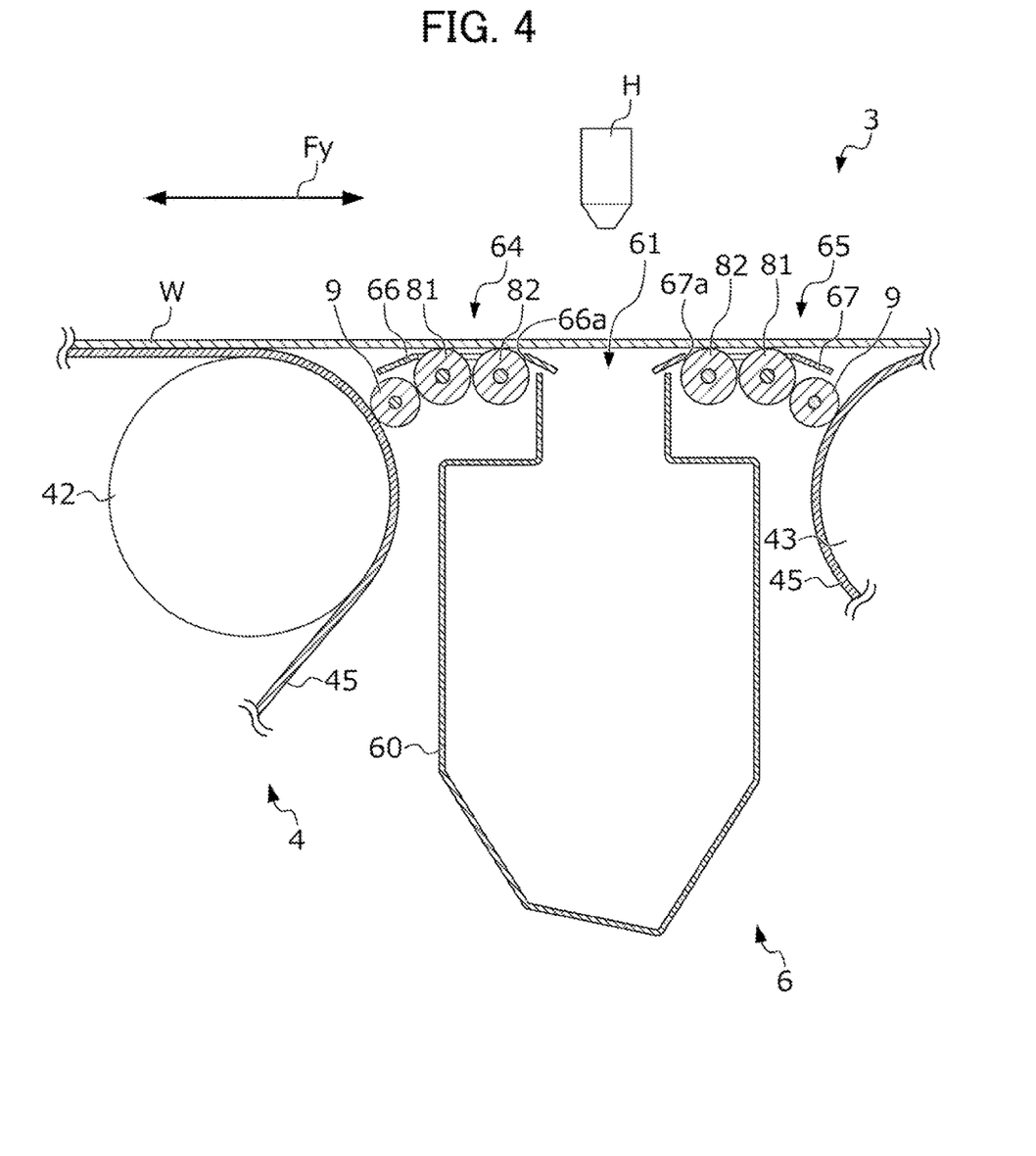
FIG. 4 is a cross-sectional view taken along the line IV-IV intersecting the pair of support rollers in FIG. 3.

FIG. 4 is a cross-sectional view taken along a line TV-IV intersecting the pair of the support rollers 8 in FIG. 3. The dust collecting box 60 is substantially U-shaped in cross-sectional view. At the upstream-side opening edge 64 of the dust collecting box 60, the outer support roller 81 and the inner support roller 82 that are each rotatable about the axis parallel to the width direction Fx (see FIG. 3) are provided in parallel in this order along the conveying direction Fy from the upstream side to the downstream side. Furthermore, at the downstream-side opening edge 65 of the dust collecting box 60, the inner support roller 82 and the outer support roller 81 that are each rotatable about the axis parallel to the width direction Fx are provided in parallel in this order along the conveying direction Fy from the upstream side to the downstream side.

At the upstream cover 66, a plurality of upstream-side roller windows 66a which are each a substantially rectangular opening in a plan view are provided at predetermined intervals along the width direction Fx (in the example of FIG. 3, six pieces). Furthermore, as shown in FIG. 4, a portion of the outer peripheral surface of the total of six sets of the outer support rollers 81 and the inner support rollers 82 provided at the upstream-side opening edge 64 is exposed to the side of the workpiece W through these upstream-side roller windows 66a. In other words, a portion of the outer peripheral surface of the outer support rollers 81 and the inner support rollers 82 protrudes from the upper surface of the upstream cover 66 to the side of the workpiece W. Therefore, the lower surface of the workpiece W conveyed along the conveying direction Fy by the conveying device 4 is brought into contact with the outer peripheral surfaces of these outer support rollers 81 and the inner support rollers 82. Furthermore, as shown in FIGS. 3 and 4, the end of the upstream side and the end of the downstream side along the conveying direction Fy of the upstream cover 66 are slightly bent downwards in the vertical direction, respectively. Therefore, the peripheries of the plurality of sets of the outer support rollers 81 and the inner support rollers 82 provided on the upstream side opening edge 64 are covered by the upstream cover 66.

Furthermore, as shown in FIG. 4, a counter roller 9 which is rotatable about the axis parallel to the outer support roller 81 is provided between the outer support roller 81 of the upstream-side opening edge 64 and the second belt roller 42. The outer peripheral surface of the counter roller 9 is in contact with the belt 45 and the outer support roller 81. Therefore, a part of the power for conveying the workpiece W along the conveying direction Fy in the conveying device 4 as a belt conveyor is transmitted to the outer support roller 81 via the counter roller 9. This allows the outer support roller 81 to rotate in synchronization with the conveying operation of the workpiece W by the conveying device 4. It should be noted that FIG. 4 illustrates a case in which the outer peripheral surface of the counter roller 9 is in contact with the belt 45; however, the present invention is not intended to be limited thereto. The outer peripheral surface of the counter roller 9 may be in contact with the outer peripheral surface of the second belt roller 42.

At the downstream cover 67, a plurality of downstream-side roller windows 67a, which are each a substantially rectangular opening in a plan view, are provided at predetermined intervals along the width direction Fx (in the example of FIG. 3, six pieces). Furthermore, as shown in FIG. 4, a portion of the outer peripheral surface of the total 6 sets of the outer support rollers 81 and the inner support rollers 82 provided at the downstream-side opening edge 65 is exposed to the side of the workpiece W through these downstream side roller windows 67a. In other words, a portion of the outer peripheral surface of the outer support roller 81 and the inner support roller 82 protrudes from the upper surface of the downstream cover 67 to the side of the workpiece W. Therefore, the lower surface of the workpiece W conveyed along the conveying direction Fy by the conveying device 4 is brought into contact with the outer peripheral surfaces of these outer support roller 81 and the inner support roller 82. Furthermore, as shown in FIGS. 3 and 4, the end of the upstream side and the end of the downstream side along the conveying direction Fy of the downstream cover 67 are slightly bent down in the vertical direction, respectively. Therefore, the peripheries of the plurality of sets of the outer support rollers 81 and the inner support roller 82 provided at the downstream-side opening edge 65 are covered by the downstream cover 67.

Furthermore, as shown in FIG. 4, the counter roller 9 which is rotatable about the axis parallel to the outer support roller 81 is provided between the outer support roller 81 of the downstream-side opening edge 65 and the third belt roller 43. The outer peripheral surface of the counter roller 9 is in contact with the belt 45 and the outer support roller 81. Therefore, a portion of the power for conveying the workpiece W along the conveying direction Fy in the conveying device 4 as a belt conveyor is transmitted to the outer support roller 81 via the counter roller 9. This allows the outer support roller 81 to rotate in synchronization with the conveying operation of the workpiece W by the conveying device 4. It should be noted that FIG. 4 illustrates a case in which the outer peripheral surface of the counter roller 9 is in contact with the belt 45; however, the present invention is not intended to be limited thereto. The outer peripheral surface of the counter roller 9 may be in contact with the outer peripheral surface of the third belt roller 43.

Figure 5:
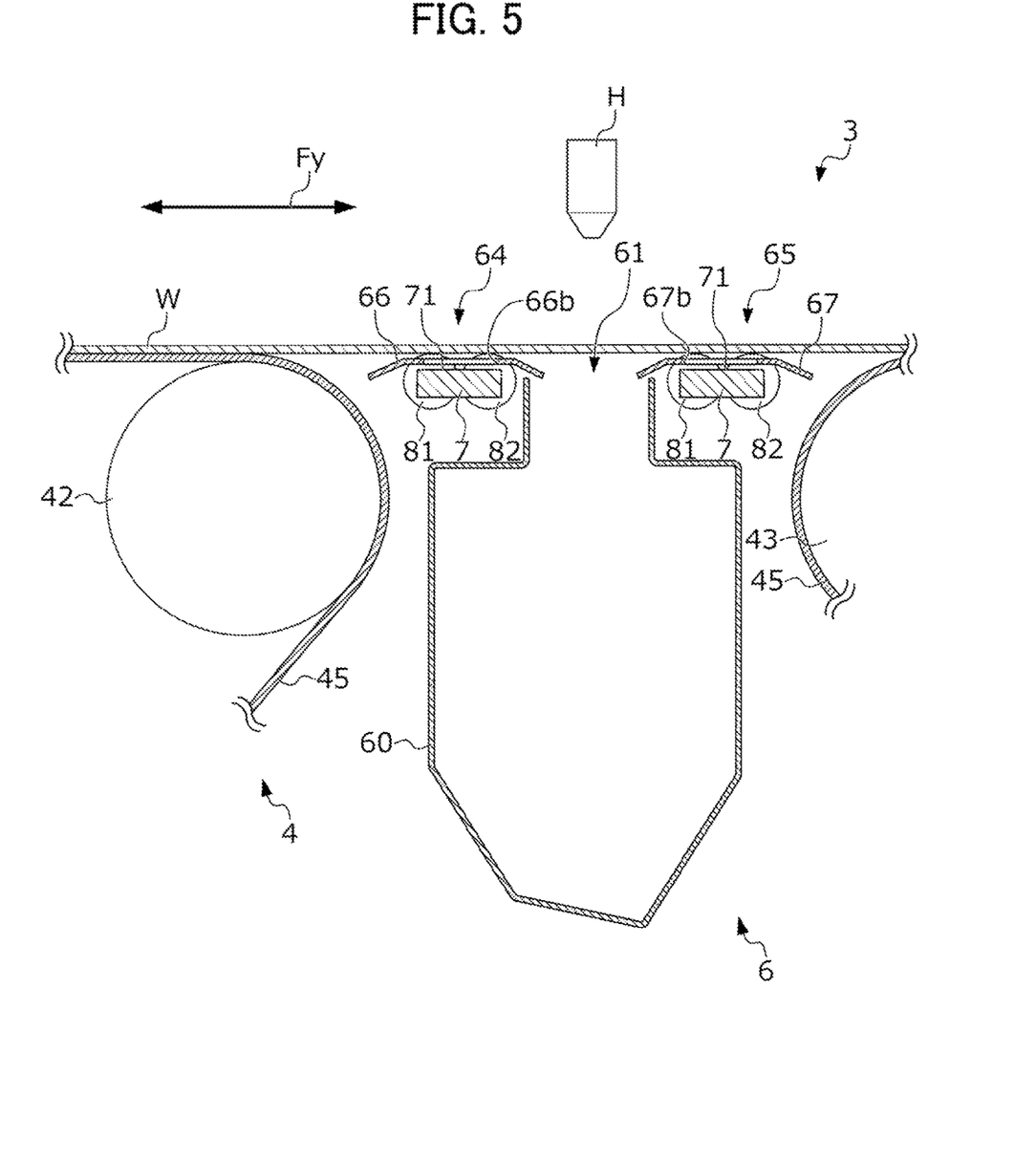
FIG. 5 is a cross-sectional view taken along the line V-V intersecting the non-contact support pad in FIG. 3.

FIG. 5 is a cross-sectional view taken along the line V-V intersecting the non-contact support pad 7 in FIG. 3. The disk-shaped non-contact support pad 7 in a plan view is respectively provided at the upstream-side opening edge 64 and the downstream-side opening edge 65 of the dust collecting box 60.

Figure 6A:
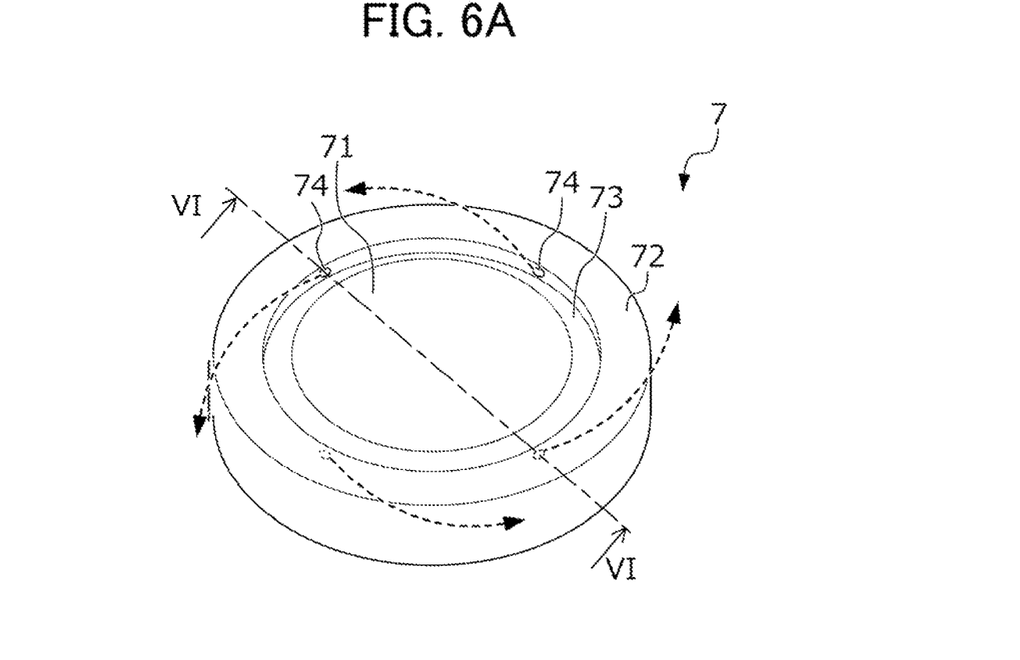
FIG. 6A is a perspective view of the non-contact support pad from a suction surface side.
Figure 6B:
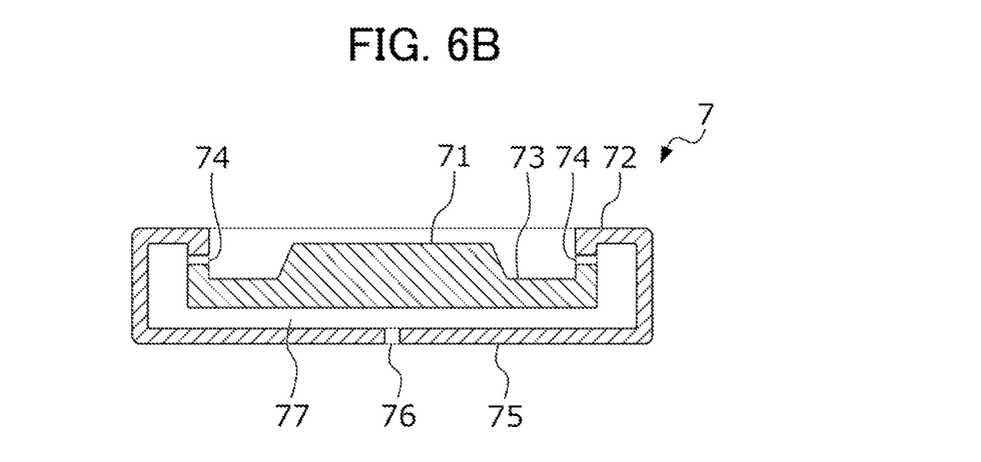
FIG. 6B is a cross-sectional view of a non-contact support pad 7 along the line VI-VI in FIG. 6A.

FIG. 6A is a perspective view of the non-contact support pad 7 from a side of a suction surface 71. FIG. 6B is a cross-sectional view of the non-contact support pad 7 along the line VI-VI in FIG. 6A.

The non-contact support pad 7 has a cylindrical shape. An annular groove 73 in a plan view is provided at an outer peripheral edge 72 of the suction surface 71 of the non-contact support pad 7. A plurality of nozzle holes 74 (in the example of FIG. 6A, four) are provided in the groove 73. An air supply hole 76 to which an air pump (not shown) is connected is provided at substantially the center of the bottom surface 75 opposite to the suction surface 71 of the non-contact support pad 7. Furthermore, as shown in FIG. 6B, an air flow path 77 for communicating the air supply hole 76 and the plurality of nozzle holes 74 is provided inside the non-contact support pad 7.

Therefore, in the non-contact support pad 7, when supplying air compressed by the air pump to the air supply hole 76, the swirling flow of air extending radially outward as indicated by a broken line arrow in FIG. 6A is generated from the plurality of nozzle holes 74 provided in the groove 73 of the suction surface 71. Therefore, when the workpiece W exists on the side of the suction surface 71, a negative pressure is generated between the suction surface 71 and the workpiece W by the Bernoulli effect, and the workpiece W is sucked toward the suction surface 71 by the negative pressure. As described above, the non-contact support pad 7 utilizes the negative pressure generated between the lower surface of the workpiece W and the suction surface 71 when the swirling flow of air from the nozzle hole 74 is ejected, thereby suctioning the lower surface of the workpiece W toward the suction surface 71, and supporting the workpiece W without bringing the lower surface of the workpiece W and the suction surface 71 into contact with each other.

Figure 7:
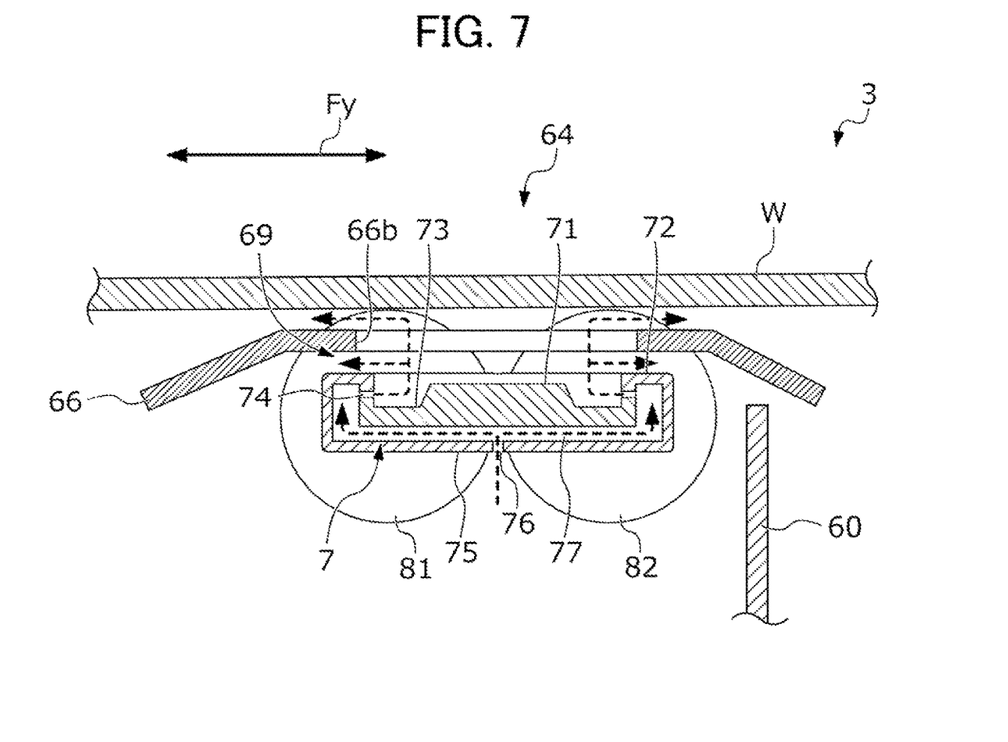
FIG. 7 is an enlarged view of an upstream-side opening edge and an upstream cover of FIG. 5.

FIG. 7 is an enlarged view of the upstream-side opening edge 64 and the upstream cover 66 of FIG. 5. It should be noted that the configurations of the downstream-side opening edge 65 and the downstream cover 67 are substantially the same as in FIG. 4, and thus, illustration and a detailed description thereof will be omitted.

As shown in FIG. 7, the peripheries of the plurality of non-contact support pads 7 provided at the upstream-side opening edge 64 are covered by the upstream cover 66. Furthermore, at the upstream cover 66, a plurality of upstream-side support pad windows 66b (in the example of FIG. 3, seven), which are each a disk-shaped opening in a plan view, is provided at predetermined intervals along the width direction Fx. The suction surface 71 of the plurality of non-contact support pads 7 provided at the upstream-side opening edge 64 is visible through the upstream-side support pad window 66b from the side of the workpiece W. The inner diameter of these upstream-side support pad windows 66b is slightly smaller than the outer diameter of the non-contact support pad 7. Therefore, the upstream cover 66 covers a portion of the outer peripheral edge 72 of the non-contact support pad 7.

As described above, the portion of the outer peripheral surface of the outer support roller 81 and the inner support roller 82 protrudes from the upper surface of the upstream cover 66 to the side of the workpiece W, while the suction surface 71 of the non-contact support pad 7 is buried from the upper surface of the upstream cover 66. As shown in FIG. 7, a gap 69 is provided between the outer peripheral edge 72 of the non-contact support pad 7 and the lower surface of the upstream cover 66.

Figure 8:
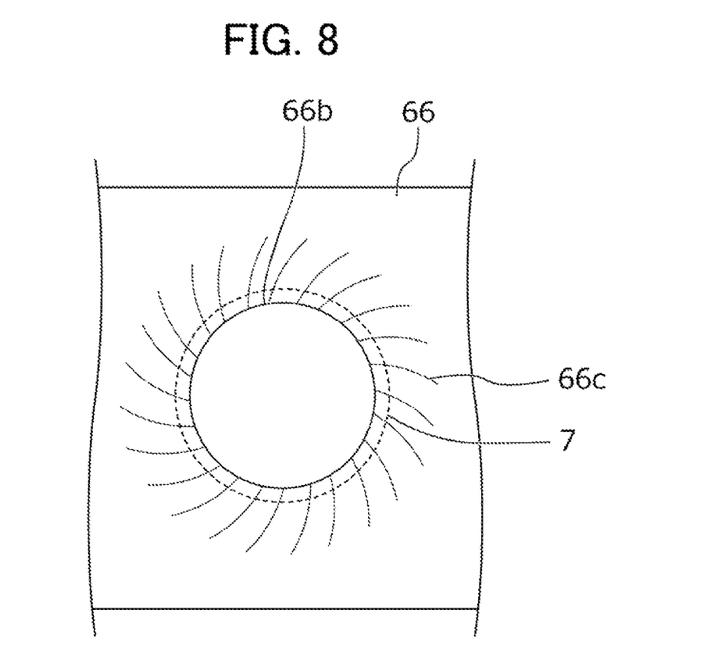
FIG. 8 is a view of a lower surface of the upstream cover seen from a side of the non-contact support pad.

FIG. 8 is a view of the lower surface of the upstream cover 66 seen from the side of the non-contact support pad 7. As shown in FIG. 8, a plurality of grooves 66c extending radially about the suction surface of the non-contact support pad 7 are provided at the peripheral edge of the upstream-side support pad window 66b of the lower surface of the upstream cover 66.

Next, a description will be given of a procedure for cutting the workpiece W by the laser head H while removing the waviness of the workpiece W in the laser processing apparatus 3 as described above. First, when supplying compressed air to the air supply hole 76 of the non-contact support pad 7, the swirling flow of air extending radially outward from the nozzle hole 74 provided in the suction surface 71 is generated. As shown schematically by a broken line arrow in FIG. 7, the swirling flow of air flows into the gap 69 (refer to FIG. 7) provided between the lower surface of the workpiece W and the upper surface of the upstream cover 66 (or the downstream cover 67), and between the outer peripheral edge 72 of the non-contact support pad 7 and the upstream cover 66 (or the downstream cover 67), a result of which the negative pressure is generated between the suction surface 71 and the lower surface of the workpiece W. Furthermore, when the negative pressure is generated between the suction surface 71 and the lower surface of the workpiece W, the lower surface of the workpiece W is sucked toward the suction surface 71, following which the lower surface of the workpiece W is pressed against the outer peripheral surfaces of the outer support roller 81 and the inner support roller 82, a result of which the waviness of the workpiece W is removed. Therefore, with the laser processing apparatus 3, by irradiating a laser beam from the laser head H while removing the waviness of the workpiece W using the non-contact support pad 7 as described above, it is possible to cut the workpiece W with high accuracy.

The laser processing apparatus 3 according to the present embodiment has the following effects.

(1) The laser processing apparatus 3 includes: a head driving mechanism 5 that moves the laser head H above the workpiece W which is conveyed along the conveying direction Fy; and the dust collecting box 60 that moves below the workpiece W and follows the laser head H such that the dust collecting box 60 is disposed directly below the laser head H. With such a configuration, it is possible to collect spatter material generated by irradiating a laser beam from the laser head H to the workpiece W. Furthermore, in the laser processing apparatus 3, the non-contact support unit 7 is provided at the opening 61 of the dust collecting box 60, and the non-contact support unit 7 suctions the lower surface of the workpiece W toward the suction surface 71 and supports the workpiece W without bringing the lower surface of the workpiece W and the suction surface 71 into contact with each other. With such a configuration, it is possible to suction a portion of the workpiece W to which the laser beam is irradiated to the suction surface 71 of the non-contact support pad 7. Therefore, even when there is waviness in the workpiece W to be conveyed, it is possible to irradiate the laser beam while removing this waviness, making it possible to cut the workpiece W with good precision. Furthermore, in the laser processing apparatus 3, the non-contact support pad 7 supporting the workpiece W without bringing the lower surface of the workpiece W and the suction surface 71 into contact with each other is used as a means for supporting the workpiece W, thereby making it possible to remove the waviness without causing damage to the surface of the workpiece W.

(2) In the laser processing apparatus 3, the non-contact support pad 7, and the outer support roller 81 and the inner support roller 82 that are each rotatable about an axis parallel to the width direction Fx are provided at the opening 61 of the dust collecting box 60. Furthermore, in the laser processing apparatus 3, the lower surface of the workpiece W is in non-contact with the suction surface 71 of the non-contact support pad 7, but in contact with the outer peripheral surfaces of the support rollers 81 and 82. Therefore, according to the laser processing apparatus 3, it is possible to remove the waviness of the workpiece W by the non-contact support pad 7 suctioning the lower surface of the workpiece W toward the suction surface 71 and pressing the lower surface of the workpiece W against the outer peripheral surfaces of the support rollers 81 and 82. Furthermore, in this situation, it is also possible to convey the workpiece W along the conveying direction Fy without causing any damage by pressing the lower surface of the workpiece W against the outer peripheral surfaces of the support rollers 81 and 82.

(3) In the laser processing apparatus 3, one or more of the support rollers 81 and 82, and one or more of the non-contact support pad 7 are provided alternately along the width direction Fx for each of the upstream-side opening edge 64 and the downstream-side opening edge 65 extending along the width direction Fx. With such a configuration, it is possible to suction and support the portion of the workpiece W to which the laser beam from the laser head H is applied, a result of which it is possible to reliably remove the waviness in the portion to which the laser beam is irradiated.

(4) In the laser processing apparatus 3, the non-contact support pad 7 suctions the lower surface of the workpiece W toward the suction surface 71 by a negative pressure generated between the lower surface of the workpiece W and the suction surface 71 when a swirling flow of air from a nozzle hole 74 provided at the outer peripheral edge 72 of the suction surface 71 is ejected. Furthermore, in the laser processing apparatus 3, the upstream cover 66 and the downstream cover 67 cover the peripheries of the support rollers 81 and 82, and the suction surface 71, a portion of the outer peripheral surface of the support rollers 81 and 82 protrudes from the upper surface of the upstream cover 66 and the downstream cover 67, and the suction surface 71 is buried from the upper surface of the upstream cover 66 and the downstream cover 67. With such a configuration, it is possible to provide the gap 69 that discharges the swirling flow of air between the lower surface of the workpiece W and the suction surface 71. Therefore, a negative pressure is generated between the lower surface of the workpiece W and the suction surface 71 due to the Bernoulli effect while the workpiece W is prevented from rising by the air. By using this negative pressure, it is possible to suction the lower surface of the workpiece W toward the suction surface 71 to remove the waviness in the workpiece W.

(5) In the laser processing apparatus 3, the upstream cover 66 and the downstream cover 67 cover at least a portion of the outer peripheral edge 72 of the suction surface 71, and a gap 69 is provided between the outer peripheral edge 72 and the lower surfaces of the upstream cover 66 and the downstream cover 67. With such a configuration, it is possible to lead a portion of the swirling flow of air ejecting from the nozzle hole 74 of the suction surface 71 to the lower surfaces of the upstream cover 66 and the downstream cover 67. Therefore, it is possible to cool the upstream cover 66 and the downstream cover 67 while generating the negative pressure between the lower surface of the workpiece W and the suction surface 71 due to the Bernoulli effect. Furthermore, by cooling the upstream cover 66 and the downstream cover 67 by the portion of the swirling flow of air as described above, it is possible to cool the spatter generated by irradiating the laser beam, a result of which it is possible to prevent the spatter from bonding to the support rollers 81 and 82, the covers 66 and 67, and the like. Furthermore, with such a configuration, it is possible to prevent the spatter from bonding to the workpiece W.

(6) In the laser processing apparatus 3, a groove 66*c* extending radially about the suction surface 71 is provided at a lower surface of the covers 66 and 67. With such a configuration, it is possible to improve the cooling effect of the covers 66 and 67 due to the swirling flow of air ejected from the nozzle hole 74 of the suction surface 71.

While an embodiment of the present invention has been described above, the present invention is not intended to be limited thereto. Within the spirit of the present invention, the configuration of detailed parts may be changed as appropriate.

For example, in the above embodiment, the case has been described in which the counter roller 9 is used as a power transmission mechanism for transmitting the power of the conveying device 4 as a belt conveyor to the upstream-side support roller 81; however, the present invention is not limited thereto. The power transmission mechanism is not limited to the counter roller 9, and may be configured by combining components such as a shaft and a belt.

Furthermore, for example, in the above embodiment, the case has been described in which the counter roller 9 is used as a driving mechanism for rotating the upstream-side support roller 81 in synchronization with the conveying operation of the workpiece W by the conveying device 4; however, the present invention is not limited thereto. For example, an actuator for rotating the upstream-side support roller 81 may be provided to drive this actuator in synchronization with the conveying operation by the conveying device 4, thereby rotating the upstream-side support roller 81 in synchronization with the conveying operation of the workpiece W by the conveying device 4.

What is claimed is:

1. A laser processing apparatus comprising:
a laser head;
a head driving mechanism configured to move the laser head above a plate material which is conveyed along a conveying direction; and
a dust collecting box configured to move below the plate material and follow the laser head such that the dust collecting box is disposed directly below the laser head,
wherein a non-contact support pad and a roller pair including first and second rollers are provided at an opening of the dust collecting box, the non-contact support pad suctions a lower surface of the plate material toward a suction surface and supports the plate material without bringing the lower surface of the plate material and the suction surface into contact with each other, and the first and second rollers are rotatable about an axis parallel to a width direction orthogonal or substantially orthogonal to the conveying direction,
the lower surface of the plate material is in contact with an outer peripheral surface of the first and second rollers,
the opening includes an upstream-side opening edge extending along the width direction, and a downstream-side opening edge extending along the width direction on a downstream side of the upstream-side opening edge in the conveying direction, in a plan view, and
one or more of the roller pairs and one or more of the non-contact support portions are provided alternately along the width direction at each of the upstream-side opening edge and the downstream-side opening edge.

2. The laser processing apparatus according to claim 1, further comprising a shielding plate that covers a periphery of the first and second rollers and the suction surface,
wherein the non-contact support pad suctions the lower surface of the plate material toward the suction surface by a negative pressure generated between the lower surface of the plate material and the suction surface when a swirling flow of air from a nozzle provided at an outer peripheral edge of the suction surface is ejected,
a portion of the outer peripheral surface of the first and second rollers protrudes from an upper surface of the shielding plate, and
the suction surface is further from the lower surface of the plate material than the upper surface of the shielding plate.

3. The laser processing apparatus according to claim 1, further comprising a shielding plate that covers a periphery of the first and second rollers and the suction surface,
wherein the non-contact support pad suctions the lower surface of the plate material toward the suction surface by a negative pressure generated between the lower surface of the plate material and the suction surface when a swirling flow of air from a nozzle provided at an outer peripheral edge of the suction surface is ejected, a portion of the outer peripheral surface of the first and second rollers protrudes from an upper surface of the shielding plate, and the suction surface is further from the lower surface of the plate material than the upper surface of the shielding plate.

4. The laser processing apparatus according to claim 2, wherein the shielding plate covers at least a portion of the outer peripheral edge, and a gap is provided between the outer peripheral edge and a lower surface of the shielding plate.

5. The laser processing apparatus according to claim 3, wherein the shielding plate covers at least a portion of the outer peripheral edge, and a gap is provided between the outer peripheral edge and a lower surface of the shielding plate.

6. The laser processing apparatus according to claim 2, wherein a plurality of grooves extending radially about the suction surface are provided at a lower surface of the shielding plate.

7. The laser processing apparatus according to claim 3, wherein a plurality of grooves extending radially about the suction surface are provided at a lower surface of the shielding plate.

8. The laser processing apparatus according to claim 4, wherein a plurality of grooves extending radially about the suction surface are provided at a lower surface of the shielding plate.

9. The laser processing apparatus according to claim 5, wherein a plurality of grooves extending radially about the suction surface are provided at a lower surface of the shielding plate.

* * * * *